US00RE40573E

(19) United States
(12) Reissued Patent
Ogiwara et al.

(10) Patent Number: US RE40,573 E
(45) Date of Reissued Patent: Nov. 18, 2008

(54) MASTER CYLINDER

(75) Inventors: Takato Ogiwara, Kawasaki (JP); Kenji Sano, Kawasaki (JP); Naganori Koshimizu, Kawasaki (JP); Hiromi Ando, Kawasaki (JP)

(73) Assignee: Kabushiki Kaisha Hitachi Seisakusho, Tokyo (JP)

(21) Appl. No.: 11/368,335

(22) Filed: Mar. 2, 2006

Related U.S. Patent Documents

Reissue of:
(64) Patent No.: 6,698,202
Issued: Mar. 2, 2004
Appl. No.: 10/084,261
Filed: Feb. 26, 2002

(30) Foreign Application Priority Data

Feb. 26, 2001 (JP) ..... 2001-051126
Feb. 26, 2001 (JP) ..... 2001-051128
Mar. 30, 2001 (JP) ..... 2001-097856

(51) Int. Cl.
*B60T 11/224* (2006.01)

(52) U.S. Cl. ..... 60/578
(58) Field of Classification Search ..... 60/578
See application file for complete search history.

(56) References Cited

U.S. PATENT DOCUMENTS 2,104,735 A * 1/1938 Carroll et al. ..... 60/578
2,196,190 A * 4/1940 Bowen ..... 60/578
4,156,348 A 5/1979 Brown
4,170,386 A * 10/1979 Shutt ..... 60/574
4,254,624 A * 3/1981 Gaiser ..... 60/574
4,329,846 A * 5/1982 Gaiser ..... 60/578
4,472,940 A 9/1984 Kubota
4,571,944 A * 2/1986 Kubota ..... 60/578
5,239,828 A * 8/1993 Gawlick ..... 60/581

FOREIGN PATENT DOCUMENTS

DE 28 28 199 A1 4/1979
DE 31 19 488 A1 3/1982

* cited by examiner

*Primary Examiner*—F. Daniel Lopez
(74) *Attorney, Agent, or Firm*—Brinks Hofer Gilson & Lione

(57) ABSTRACT

A master cylinder of the invention supplies a brake fluid from a large diameter pressurizing chamber 56 to a small diameter hydraulic chamber 49 by opening a reverse flow checking opening and closing portion 61 by sliding movement of a stepped piston 16 forwardly, that is, fast fill and when the hydraulic pressure of the large diameter pressurizing chamber 56 rises, a control valve 86 escapes the hydraulic pressure of the large diameter pressurizing chamber 56 to a reservoir 12 to gradually lower in accordance with rise of the hydraulic pressure of the small diameter hydraulic chamber 49, thereby capable of reducing a strange feeling in a pedal feeling caused by sudden pressure release of the large diameter pressurizing chamber 56.

10 Claims, 8 Drawing Sheets

MASTER CYLINDER

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a master cylinder for supplying a brake fluid to a brake apparatus of an automobile or the like.

2. Description of the Related Art

As a conventional master cylinder, as described in a microfilm of A Japanese Utility Model Application No. 152602/1980 (Japanese Utility Model Laid-Open No. 73248/1982), there is provided a constitution in which by carrying out so-to-speak fast fill for supplying a large volume of a brake fluid at an initial stage of operation when the brake fluid is supplied to a brake apparatus such as a disk brake or a drum brake, an ineffective fluid amount at an initial stage of stroke is compensated for, and as a result, a pedal stroke can be shortened (fast fill type master cylinder).

The fast fill type master cylinder is provided with a stepped cylinder having a large diameter cylinder portion and a small diameter cylinder portion, a stepped piston having a large diameter piston portion slidably inserted into the large diameter cylinder portion of the stepped cylinder and a small diameter piston portion slidably inserted into the small diameter cylinder portion of the stepped cylinder, and a cup seal (reverse flow checking opening and closing portion) for partitioning the inside of the stepped cylinder into a large diameter pressurizing chamber on the large diameter piston portion side and a small diameter hydraulic chamber on the small diameter piston portion side and permitting the brake fluid flow only from the large diameter pressurizing chamber side to the small diameter hydraulic chamber side.

Further, when the stepped piston is slidingly moved toward the small diameter hydraulic chamber by an input from a brake pedal, a volume of the large diameter pressurizing chamber is reduced by the sliding movement of the stepped piston, so that the reverse flow checking opening and closing portion is opened to supply the fluid from the large diameter pressurizing chamber side to the small diameter hydraulic chamber side the above-described fast fill, which carries out.

Further, the fast fill type master cylinder is provided with a relief valve for escaping the brake fluid from the large diameter pressurizing chamber to a reservoir when an inner pressure of the large diameter pressurizing chamber becomes equal to or higher than a predetermined value, and a notch is provided at the relief valve to always communicate the large diameter pressurizing chamber to the reservoir. Through the communication path of an extremely small diameter due to the notch, the fluid is supplied form the reservoir to the large diameter pressurizing chamber.

Meanwhile, there poses a problem that since the above-described master cylinder is provided with the notch, when the pressure is elevated slowly, the fluid of the large diameter pressurizing chamber flows to the reservoir and the fast fill cannot be carried out sufficiently.

Further, according to the above-described master cylinder, when the inner pressure of the large diameter pressurizing chamber becomes equal to or higher than the predetermined value, the relief valve is opened and the brake fluid is quickly escaped from the large diameter pressuring chamber to the reservoir. Therefore, when the pressure is elevated at high rate, namely when in operation of the brake pedal is stepped at comparatively fast, the hydraulic pressure of the large diameter pressurizing chamber is quickly released by the opening operation of the relief valve when hydraulic pressure of the large diameter pressurizing chamber is elevated to the predetermined pressure and therefore, a pedal stroke is extended without being accompanied by pedal reaction force and the piston is moved to the small diameter hydraulic chamber side. This has brought about a strange feeling in the pedal operation that the vehicle speed is reduced without a real feeling that the pedal is depressed.

Further, there is another conventional fast fill type master cylinder having a cut-off portion on the large diameter pressurizing chamber side for cutting communication between the large diameter pressurizing chamber and the reservoir by being closed by the sliding movement to the small diameter hydraulic chamber side of the stepped piston and a cut-off portion on the small diameter hydraulic chamber side for cutting communication between the large diameter pressurizing chamber and the small diameter hydraulic chamber by being closed by the sliding movement to the small diameter hydraulic chamber side of the stepped piston in order to promote the fast fill function. In order to promote the fast fill function in such a master cylinder, it is necessary to make an ineffective stroke of the stepped piston until the cut-off portion on the small diameter hydraulic chamber side and the cut-off portion on the large diameter pressurizing chamber side are brought into a closed state, as short as possible.

However, when the ineffective stroke is simply set to be short, sectional areas of flow paths of the cut-off portion on the side of the small diameter hydraulic chamber and the cut-off portion on the side of the large diameter pressurizing chamber, are narrowed. When the sectional areas of the flow paths are narrowed in this way, in the case that the master cylinder is used in a combination with a traction control apparatus, there poses a problem that when the brake fluid is forcibly sucked from the reservoir via the master cylinder in order to make the traction control apparatus operate the brake apparatus, the brake fluid cannot be made to flow at a sufficient flow rate, that is, in high flow.

It is noted that the traction control apparatus is an apparatus that, when the brake pedal is not operated, a driver excessively operates an accelerator on a slippery road and causes a wheel spin at a drive wheel of a vehicle, controls the drive wheel by forcibly supplying the brake fluid from the reservoir to a brake apparatus such as a wheel cylinder via the master cylinder, thereby to reduce the wheel spin. The master cylinder used in the combination with the traction control apparatus must have a function capable of making the brake fluid flow to the traction control apparatus in high flow (high flow function) in an initial state.

Therefore, the applicant has conceived that a structure of previously filed Japanese Patent Application No. 294502/1998 (equivalent to U.S. Pat. No. 6,272,858 B1) to the cut-off portion on the small diameter hydraulic chamber side and the cut-off portion on the large diameter pressurizing chamber side. The structure is to close a port opened at an outer peripheral portion of the piston by a cup seal by the sliding movement of the piston. By forming a control taper face, a front side of which is smaller in diameter, rearward from the opening portion of the port at the outer peripheral portion of the piston, even when the entire of the cup seal does not completely pass over the port in the sliding movement of the piston, a rear end portion of the cup seal rides over the control taper face to thereby increase face pressure and close the port. The structure can shorten the ineffective stroke of the piston while achieving the high flow.

However, when the above-described structure is applied to the cut-off portion on the small diameter hydraulic chamber side and the cut-off portion on the large diameter pressurizing chamber side, the control taper face are required in both of the cut-off portions, further, it is necessary to strictly control positional accuracy of both of the ports and therefore, there poses a problem that cost is increased.

SUMMARY OF THE INVENTION

The present invention has been made in view of the above-described situation and it is an object thereof to provide a master cylinder capable of reducing a strange feeling in a pedal operation brought when a hydraulic pressure of a large diameter pressurizing chamber is released while ensuring a fast fill function.

Further, it is another object of the invention to provide a master cylinder capable of shortening a pedal stroke while satisfying a high flow function needed in combining the master cylinder with a traction control apparatus and capable of reducing cost.

In order to achieve the above-described objects, according to an aspect of the invention, there is provided a master cylinder comprising a stepped cylinder having a large diameter cylinder portion and a small diameter cylinder portion; a stepped piston having a large diameter piston portion slidably inserted into the large diameter cylinder portion of the stepped cylinder and a small diameter piston portion slidably inserted into the small diameter cylinder portion of the stepped cylinder; and a reverse flow checking opening and closing portion for partitioning the inside of the stepped cylinder into a large diameter pressurizing chamber on the large diameter piston portion side and a small diameter hydraulic chamber on the small diameter piston portion side and permitting a brake fluid to flow only from the large diameter pressurizing chamber side to the small diameter hydraulic chamber side, the reverse flow checking opening and closing portion being opened by reducing a volume of the large diameter pressurizing chamber by sliding movement of the stepped piston toward the small diameter hydraulic chamber side to thereby supply the brake fluid from the large diameter pressurizing chamber side to the small diameter hydraulic chamber side, wherein the master cylinder is provided with a control valve for gradually reducing a hydraulic pressure of the large diameter pressurizing chamber in accordance with the rise of the hydraulic pressure of the small diameter hydraulic chamber.

Further, the master cylinder may be constructed such that the control valve includes a valve piston and a valve spring for urging the valve piston within a valve cylinder; and the valve piston reduces the hydraulic pressure of the large diameter pressurizing chamber when a total force of a propulsive force produced by the hydraulic pressure of the small diameter hydraulic chamber and a propulsive force produced by the hydraulic pressure of the large diameter pressurizing chamber exceeds an urge force by the valve spring.

Further, the master cylinder may be constructed such that it includes a reservoir for storing the brake fluid; the control valve is provided with at least two ring seals between the valve cylinder and the valve piston to partition the inside of the valve cylinder, and a chamber formed between the ring seals and the small diameter hydraulic chamber communicate with each other; and the valve spring is provided at one end side of the valve piston, and a relief chamber for communicating to the reservoir and the large diameter pressurizing chamber is provided at the other end side of the valve piston, with an opening and closing valve mechanism for communicating and cutting between the relief chamber and the large diameter pressurizing chamber being provided. Further, the master cylinder may be constructed such that the at least two ring seals are provided at the valve piston, and the diameter of the ring seal provided on the valve spring side is larger than that of the ring seal provided on the relief chamber side.

In this way, since there is provided the control valve capable of escaping the hydraulic pressure of the large diameter pressurizing chamber to the reservoir side to gradually lower it in accordance with the rise of the hydraulic pressure of the small diameter hydraulic chamber, the brake fluid is supplied from the large diameter pressurizing chamber side to the small diameter hydraulic chamber side by the opening operation of the reverse flow checking opening and closing portion by reducing the volume of the large diameter pressurizing chamber by the sliding movement of the stepped piston to the small diameter hydraulic chamber side, that is, fast fill, and when the liquid pressure of the large diameter pressurizing chamber rises, the control valve escapes the hydraulic pressure of the large diameter pressurizing chamber to the reservoir to gradually lower it in accordance with the rise of the hydraulic pressure of the small diameter hydraulic chamber. Therefore, a pedal stroke can be shortened by the effect of the fast fill, and when the hydraulic pressure of the large diameter pressurizing chamber is released, the hydraulic pressure of the large diameter pressurizing chamber is not quickly lowered but is lowered gradually.

Further, the at least two ring seals are provided at the valve piston, and the diameter of the ring seal provided on the valve spring side is larger than that of the ring seal provided on the relief chamber side. Therefore, the valve piston can be urged by the hydraulic pressure worked inside the chamber formed between the ring seals, whereby the opening and closing valve mechanism can be driven.

In addition, the master cylinder may be constructed such that the valve cylinder is partitioned into three chambers, that is, the relief chamber, the chamber formed between the ring seals and a damper chamber which stores the valve spring, by the two ring seals, and the valve piston is formed with a throttle path one end side of which is opened to the relief chamber and the other end side of which is opened to the damper chamber.

Thus, since the damper chamber and the relief chamber are communicated to each other via the throttle path, when the valve piston of the opening and closing valve mechanism finely vibrates at high speed in escaping the hydraulic pressure of the large diameter pressurizing chamber to the reservoir side to gradually lower it in accordance with the rise of the hydraulic pressure of the small diameter hydraulic chamber, the volume of the damper chamber repeatedly increases and reduces finely. As a result, the brake fluid is reciprocated between the damper chamber and the relief chamber via the throttle path, and the damper effect is achieved by constituting fluid flow resistance by the throttle path.

In addition, the master cylinder may be constructed such that it further comprises a reservoir for storing the brake fluid; a cut-off portion on the large diameter pressurizing chamber side for cutting communication between the large diameter pressurizing chamber and the reservoir by being closed by the sliding movement of the stepped piston to the small diameter hydraulic chamber side; and a cut-off portion on the small diameter hydraulic chamber side for cutting communication between the large diameter pressurizing chamber and the small diameter hydraulic chamber by being closed by the sliding movement of the stepped piston to the small diameter hydraulic chamber side, wherein an ineffective stroke of the stepped piston until the cut-off portion on the small diameter hydraulic chamber side is brought into a closed state is made longer than an ineffective stroke of the stepped piston until the cut-off portion on the large diameter pressurizing chamber side is brought into a closed state.

Further, according to another aspect of the invention, there is provided a master cylinder comprising a stepped cylinder having a large diameter cylinder portion and a small diameter cylinder portion; a stepped piston having a large diameter piston portion slidably inserted into the large diameter cylinder portion of the stepped cylinder and a small diameter piston portion slidably inserted into the small cylinder portion of the stepped cylinder; a reverse flow checking opening and closing portion for partitioning the inside of the stepped cylinder into a large diameter pressurizing chamber on the large diameter piston portion side and a small diameter hydraulic chamber on the small diameter piston portion side and permitting a brake fluid to flow only from the large diameter pressurizing chamber side to the small diameter hydraulic chamber; a cut-off portion on the large diameter pressurizing chamber side for cutting communication between the large diameter pressurizing chamber and a reservoir by being closed by sliding movement of the stepped piston to the small diameter hydraulic chamber; and a cut-off portion on the small diameter hydraulic chamber side for cutting communication between the large diameter pressurizing chamber and the small diameter hydraulic chamber by being closed by the sliding movement of the stepped piston to the small diameter hydraulic chamber side, the brake fluid being supplied from the large diameter pressurizing chamber side to the small diameter hydraulic chamber side by the opening operation of the reverse flow checking opening and closing portion by reducing a volume of the large diameter pressurizing chamber by the sliding movement of the stepped piston to the small diameter hydraulic chamber side, wherein an ineffective stroke of the stepped piston until the cut-off portion on the small diameter hydraulic chamber side is brought into the closed state is made longer than an ineffective stroke of the stepped piston until the cut-off portion on the large diameter pressurizing chamber side is brought into a closed state.

When constituted in this way, in supplying the brake fluid from the large diameter pressurizing chamber to the small diameter hydraulic chamber, even when the cut-off portion on the small diameter hydraulic chamber side having the longer ineffective stroke is not brought into the closed state, so far as the cut-off portion on the large diameter pressurizing chamber side having the shorter ineffective stroke is brought into the closed state, the brake fluid flow caused by reducing the volume of the large diameter pressurizing chamber by the sliding movement of the stepped piston toward the small diameter hydraulic chamber, via the cut-off portion on the small diameter hydraulic chamber side, is from the large diameter pressurizing chamber side to the small diameter hydraulic chamber side and the same as that in supplying the fluid from the large diameter pressurizing chamber side to the small diameter hydraulic chamber side via the reverse flow checking opening and closing portion. Accordingly, the above-described fast fill function is not deteriorated.

Further, the brake fluid supply from the large diameter pressurizing chamber to the small diameter hydraulic chamber at the initial stage of the operation can be carried out without by way of the reverse flow checking opening and closing portion and therefore, no fluid flow resistance is generated, and the fast fill function is further promoted.

In this way, since the ineffective stroke of the stepped piston until the cut-off portion on the small diameter hydraulic chamber side is brought into the closed state and is made longer than the ineffective stroke of the stepped piston until the cut-off portion on the large diameter pressurizing chamber side is brought into the closed state, in shortening the ineffective stroke for realizing the fast fill function at an early stage, the master cylinder is required to control the positional accuracy only of the cut-off portion on the large diameter pressurizing chamber side in the axial direction, and it is not necessary to strictly control positional accuracy in the axial direction of the cut-off portion on the small diameter hydraulic chamber side.

Therefore, the cut-off portion on the large diameter pressurizing chamber side can be constituted in correspondence with high flow, to have a short ineffective stroke and to satisfy fast fill, and the cut-off portion on the small diameter hydraulic chamber side can be constituted to be of a low cost type in correspondence with high flow and having the long ineffective stroke.

DETAILED DESCRIPTION OF THE PREFERRED EMBODIMENTS

An explanation will be given of a master cylinder according to a first embodiment of the invention in reference to FIG. 1 through FIG. 10.

Figure 1:
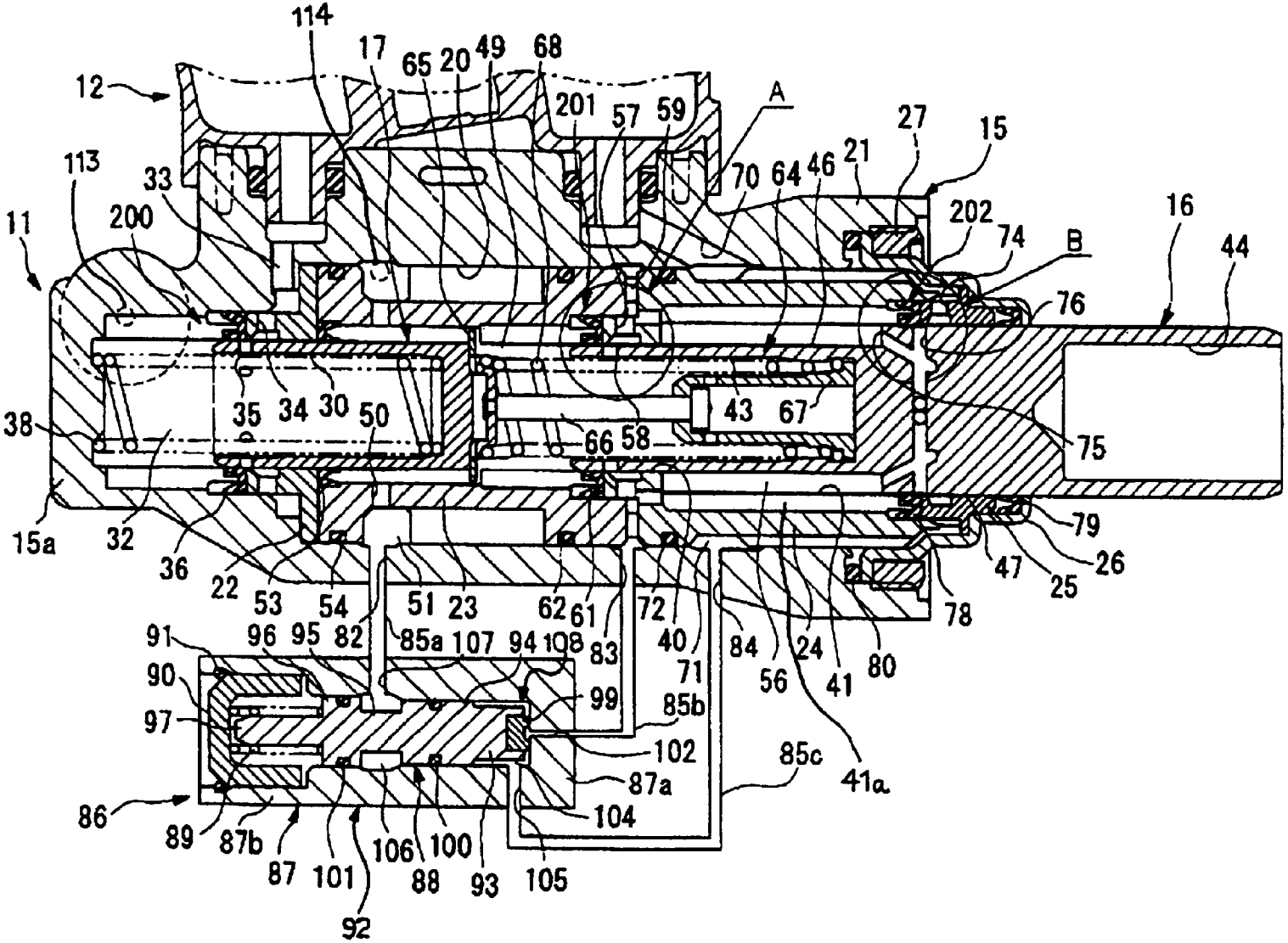
FIG. 1 is a side sectional view showing a constitution of a master cylinder according to a first embodiment of the invention.

FIG. 1 shows the master cylinder of the first embodiment and here, notation 11 designates a master cylinder main body for generating a brake hydraulic pressure in accordance with an input of a brake pedal introduced via a booster (not shown), and notation 12 designates a reservoir attached to an upper portion of the master cylinder main body 11 for storing a brake fluid which is charged to and discharged from the master cylinder main body 11.

The master cylinder main body 11 is provided with a stepped cylinder 15 having a shape of a substantially bottomed cylinder along a horizontal direction, a primary piston (stepped piston) 16 slidably fitted to portion (right side in FIG. 1) of the stepped cylinder 15, and a secondary piston 17 slidably fitted to the stepped cylinder 15 closer to a bottom portion 15a side (left side in FIG. 1), which is described later, with respect to the primary piston 16.

The stepped cylinder 15 is provided with a first member 21 in a shape of a bottomed cylinder formed with the bottom portion 15a of the stepped cylinder 15 and a hole portion 20 along the horizontal direction, a second member 22, a third member 23, a fourth member 24 and a fifth member 25 successively fitted to the inside of the hole portion 20 of the first member 21 from the bottom portion 15a side, a sixth member 26 provided to cover the fifth member 25 on an opposed side to the bottom portion 15a of the fifth member 25, and a seventh member 27 provided on the opposed side to the bottom portion 15a of the sixth member 26 and screwed to the first member 21 for holding the second member 22 through the sixth member 26 inside the first member 21.

The secondary piston 17 is slidably fitted to the inside of the second member 22. The secondary piston 17 has a shape of a bottomed cylinder with a hole portion 30 formed at one end thereof and is fitted to the second member 22 such that the hole portion 30 is opposed to the bottom portion 15a of the first member 21.

Here, a portion surrounded by the bottom portion 15a of the first member 21 and a side of the bottom portion 15a, that is, a side of the hole portion 30 of the secondary piston 17, constitutes a secondary side small diameter hydraulic chamber 32. Further, notation 113 designates a secondary side delivery hole provided at the first member 21 and the second side delivery hole 113 delivers the brake fluid to a brake apparatus or a traction control apparatus (not shown), when a hydraulic pressure is generated at the inside of the secondary side small diameter hydraulic chamber 32.

The secondary member 22 is formed with a port 34 one end of which is opened to an inner peripheral face in a diameter direction of the second member 22 and other end of which is constantly communicated with the reservoir 12 via a flow path 33 of the first member 21, and the secondary piston 17 is formed with a relief port 35 capable of communicating the port 34 and the secondary side small diameter hydraulic chamber 32.

Between the second member 22 and the first member 21 there is provided a cup seal 36 capable of cutting communication between the secondary side small diameter hydraulic chamber 32 and the port 34. When the hydraulic pressure of the secondary side small diameter hydraulic chamber 32 is equal to or higher than that of the reservoir 12, the cup seal 36 cuts the communication therebetween and when the hydraulic pressure of the secondary side small diameter hydraulic chamber 32 is lower than that of the reservoir 12, the cup seal 36 communicates therebetween to thereby enable to supply the brake fluid.

There is provided a secondary piston spring 38 between the hole portion 30 of the secondary piston 17 and the bottom portion 15a of the first member 21 for determining an interval therebetween in an initial state in which there is no input from a brake pedal (not shown) (right side in FIG. 1) (hereinafter, positions of the respective portions at this occasion are referred to as initial positions). When the respective portions are disposed at the initial positions, the secondary piston 17 communicates the relief port 35 to the port 34, and as a result, the secondary side small diameter hydraulic chamber 32 is communicated to the reservoir 12.

When the secondary piston 17 is moved from the initial position toward the bottom portion 15a of the first member 21, in case that the hydraulic pressure of the secondary side small diameter hydraulic chamber 32 is equal to or higher than that of the reservoir 12, the relief port 35 of the secondary piston 17 is closed by the cup seal 36, and the communication to the reservoir 12 is cut. As a result, the communication between the secondary side small diameter hydraulic chamber 32 and the reservoir 12 is cut, and, thereby, the secondary piston 17 is further moved toward the bottom portion 15a, so that the brake fluid is supplied from the secondary side small diameter hydraulic chamber 32 to a brake apparatus or a traction control apparatus (not shown) via the secondary side delivery hole 113.

Here, the secondary piston 17 including the relief port 35, and the cup seal 36 constitute a secondary side cut-off portion 200 closed by the sliding movement of the secondary piston 17 to the secondary side small diameter hydraulic chamber 32.

The fourth member 24 is constituted in a stepped shape having a small diameter cylinder portion 40 on the side of the bottom portion 15a of the first member 21 and a large diameter cylinder portion 41 having a diameter larger than that of the small diameter cylinder portion 40 on an opposed side to the bottom portion 15a of the first member 21 and the primary piston 16 is slidably fitted to the inside of the small diameter cylinder portion 40. The large diameter cylinder portion 41 is provided with a plurality of grooves 41a in the axial direction at intervals in the peripheral direction.

The primary piston 16 is provided with a hole portion 43 at one end arranged to be opposed to the secondary cylinder 17 and a hole portion 44 at the other end to which a rod of a booster is inserted (not shown), and is provided at the one end with a small diameter piston portion 46 slidably inserted into the small diameter cylinder portion 40 of the fourth member 24 and is provided at the other end with a large diameter piston portion 47 slidably inserted into the large diameter cylinder portion 41 of the fourth member 24. The large diameter piston portion 47 is also slidably inserted into the fifth member 25.

A portion surrounded by a side of the secondary piston 17 opposed to the bottom portion 15a, and a side of the small diameter piston portion, that is, a side of the hole portion 43 of the primary piston 16 and the third member 23, constitutes a primary side small diameter hydraulic chamber (small diameter hydraulic chamber) 49. Further, notation 114 designates a primary side delivery hole provided at the first member 21 and the primary side delivery hole 114 delivers the brake fluid to a wheel cylinder or a traction control apparatus (not shown) when hydraulic pressure is generated inside the primary side small diameter hydraulic chamber 49.

Here, there is formed a small diameter hydraulic chamber communication path 51 between the third member 23 and the first member 21 for constantly communicating to the primary side small diameter hydraulic chamber 49 via a hole portion 50.

There is provided a cup seal 53 between the second member 22 and the third member 23 and the secondary piston 17 for cutting communication between the primary side small diameter hydraulic chamber 49 and the flow path 33 and the port 34.

Further, there if provided an O-ring 54 for constantly cutting communication between the small diameter hydraulic chamber communication path 51 and the flow path 33 and the port 34 between a side of the bottom portion 15a of the third member 23 further from the small diameter hydraulic chamber communication path 51 and the first member 21.

A portion surrounded by the primary piston 16 and a side of the large diameter cylinder portion 41 of the fourth member 24, constitutes a large diameter pressurizing chamber 56 on the side of the large diameter piston portion 47.

The fourth member 24 is formed with a port 57 one end of which is opened to an inner peripheral face in a diameter direction of the small diameter cylinder portion 40 and the other end of which is constantly communicated with the large diameter pressurizing chamber 56, and the small diameter piston portion 46 of the primary piston 16 is formed with a relief port 58 capable of communicating the port 57 and the hole portion 43, that is, the primary side small diameter hydraulic chamber 49. Further, the port 57 is constantly communicated also with a pressurizing chamber communication flow path 59 between the third member 23 and the fourth member 24.

There is provided a cup seal (reverse flow checking opening and closing portion) 61 capable of cutting communication between the primary side small diameter hydraulic chamber 49 and the large diameter pressurizing chamber 56 between the third member 23 and the fourth member 24 and the small diameter piston portion 46 of the primary piston 16. When the hydraulic pressure of the primary side small diameter hydraulic chamber 49 is equal to or higher than that of the large diameter pressurizing chamber 56, the cup seal 61 cuts communication therebetween the conversely, when the hydraulic pressure of the large diameter pressurizing chamber 56 is higher than that of the primary side small diameter hydraulic chamber 49, the cup seal 61 makes communicatable therebetween. In other words, the cup seal 61 partitions inside the stepped cylinder 15 into the large diameter pressurizing chamber 56 on the side of the large diameter piston portion 47 and the primary side small diameter hydraulic chamber 49 on the side of the small diameter piston portion 46, and permits flow of the brake fluid only from the side of the large diameter pressurizing chamber 56 to the side of the primary small diameter hydraulic chamber 49.

Between a side opposed to the bottom portion 15a of the third member 23 further from the small diameter hydraulic chamber communication flow path 51 and the first member 21, there is provided an O-ring 62 for constantly cutting communication between the small diameter hydraulic chamber communication flow path 51 and the side of the large diameter pressurizing chamber 56.

There is provided a primary initial position determining mechanism 64 between the secondary piston 17 and the primary piston 16 for determining an interval therebetween in the initial state in which there is no input from the side of the brake pedal, not illustrated, (right side in FIG. 1). The primary initial position determining mechanism 64 is provided with a contact member 65 in contact with the secondary piston 17, a shaft member 66 fixed to the contact member 65 to extend to the side of the primary piston 16, a contact member 67 for movably holding the shaft member 66 in a predetermined range and in contact with a bottom of the hole portion 43 of the primary piston 16, and a primary piston spring 68 for urging the contact members 65 and 67 in opposed directions.

When the primary initial position determining mechanism 64 dispose the contact members 65 and 67 at remotest positions prescribed by the shaft member 66 by urge force of the primary piston spring 68, the primary piston 16 is arranged at the initial position, while at this occasion, the relief port 58 is communicated to the port 57 and the primary side small diameter hydraulic chamber 49 is communicated to the large diameter pressurizing chamber 56.

When the primary piston 16 moves from the initial position to the side of the bottom portion 15a, in the case that the hydraulic pressure of the primary side small diameter hydraulic chamber 49 is equal to or higher than the large diameter pressurizing chamber 56, the relief port 58 of the primary piston 16 is closed by the cup seal 61, communication to the port 57 is cut, and communication between the primary side small diameter hydraulic chamber 49 and the side of the large diameter pressurizing chamber 56 via the relief port 58 is cut. When the primary piston 16 moves from the state further to the side of the bottom portion 15a, the brake fluid is supplied from the primary side small diameter hydraulic chamber 49 to a brake apparatus or a traction control apparatus (not shown) via the primary side delivery hole 114. It is noted that, even when the relief port 58 is closed, if the hydraulic pressure of the large diameter pressurizing chamber 56 is equal to or higher than that of the primary side small diameter hydraulic chamber 49, the brake fluid of the large diameter pressurizing chamber 56 flows to the primary side small diameter hydraulic chamber 49 via the cup seal 61.

Here, the small diameter piston portion 46 including the relief port 58, and the cup seal 61 constitute a small diameter hydraulic chamber side cut-off portion 201 for cutting communication between the large diameter pressurizing chamber 56 and the primary side small diameter hydraulic chamber 49 by being closed by sliding movement of the primary piston 16 to the side of the primary side small diameter hydraulic chamber 49.

The fourth member 24 forms a fluid supply chamber 71 under the atmospheric pressure constantly communicating to the reservoir 12 via a flow path 70 of the first member 21 between the fourth member 24 and the first member 21. Between a side of the bottom portion 15a of the fourth member 24 further from the fluid supply member 71 and the first member 21, there is provided an O-ring 72 for constantly cutting communication between the large diameter side pressurizing chamber 56 and the fluid supply chamber 71.

The fifth member 25 is formed with a port 74 one end of which is opened to an inner peripheral face in a diameter direction thereof and the other end of which is constantly communicated with the fluid supply chamber 71, and the primary piston 16 is formed with a relief port 76 one end of which can be communicated to the port 74, that is, the fluid supply chamber 71 by being opened to an outer peripheral face in a diameter direction of the large diameter piston portion 47 and the other end of which is constantly communicated with a stepped portion 75 at a boundary between the large diameter piston portion 47 and the small diameter piston portion 46, that is, the large diameter pressurizing chamber 56.

Between the fourth member 24 and the fifth member 25 and the large diameter piston portion 47 of the primary piston 16, there is provided a cup seal 78 capable of cutting communication between the large diameter pressurizing chamber 56 and the fluid supply chamber 71. When the hydraulic pressure of the large diameter pressurizing chamber 56 is equal to or higher than that of the fluid supply chamber 71, the cup seal 78 cuts communication therebetween and conversely, when the hydraulic pressure of the fluid supply chamber 71 is higher than the hydraulic pressure of the large diameter pressurizing chamber 56, the cup seal 78 supplies the fluid by communicating therebetween.

At the initial position, the primary piston 16 communicates the relief port 76 to the port 74 and communicates the large diameter pressurizing chamber 56 to the fluid supply chamber 71. Further, when the primary piston 16 slidingly moves from the initial position to the side of the bottom portion 15a, that is, to the side of the primary side small diameter hydraulic chamber 49, if the hydraulic pressure on the side of the large diameter pressurizing chamber 56 is equal to or higher than that of the fluid supply chamber 71, the relief port 76 is closed by the cup seal 78 to cut communication to the port 74, and communication between the large diameter pressurizing chamber 56 and the fluid supply chamber 71 via the relief port 76, is cut. When slidingly moved further to the side of the primary side small diameter hydraulic chamber 49, the primary piston 16 elevates the hydraulic pressure of the large diameter pressurizing chamber 56 by reducing the volume of the large diameter pressurizing chamber 56 by the large diameter piston portion 47, the cup seal 61 provided between the large diameter pressurizing chamber 56 and the primary side small diameter hydraulic chamber 49, is opened and the fluid is supplied from the side of the large diameter pressurizing chamber 56 to the primary side small diameter hydraulic chamber 49.

Here, the large diameter piston portion 47 including the relief port 76, and the cup seal 78 constitute a large diameter pressurizing chamber side cutting portion 202 for cutting communication between the large diameter pressurizing chamber 56 and the fluid supply chamber 71, that is, the reservoir 12 by being closed by sliding movement of the primary piston 16 toward the primary side small diameter hydraulic chamber 49.

A cup seal 79 is provided between the fifth member 25 and the sixth member 26 and the large diameter piston portion 47 of the primary piston 16 while an O-ring 80 is provided between the first member 21 and the sixth member 26.

Further, the relief ports 35, 58 and 76 have as large diameter as 2 mm for restraining fluid flow resistance and are respectively provided at several locations.

Further, according to the embodiment, when an ineffective stroke of the primary piston 16 until the small diameter hydraulic chamber side cut-off portion 201 is brought into a closed state, is made longer than that of the primary piston 16 until the large diameter pressurizing chamber side cut-off portion 202 is brought into a closed state, specifically, the large diameter pressurizing chamber side cut-off portion 202 is constituted in correspondence with high flow, having a short ineffective stroke and in correspondence with fast fill while the small diameter hydraulic chamber side cut-off portion 201 is constituted in correspondence with high flow, having a long ineffective stroke and of a low cost type.

Figure 2:
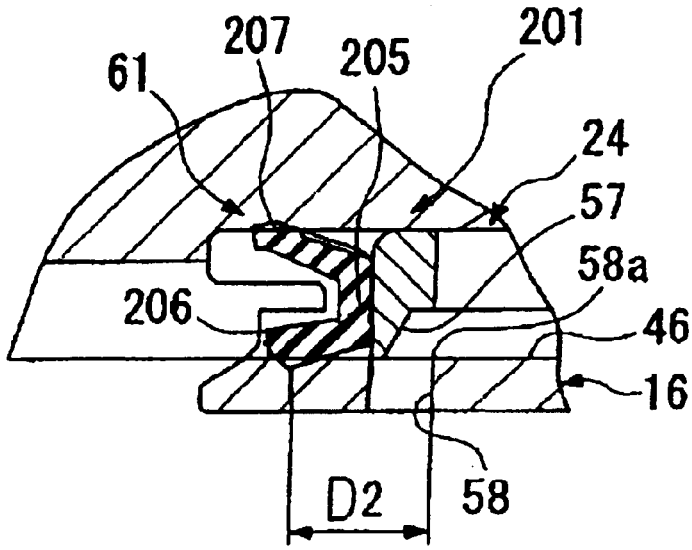
FIG. 2 is a detailed view of portion A in FIG. 1 of the master cylinder according to the first embodiment of the invention.
Figure 3:
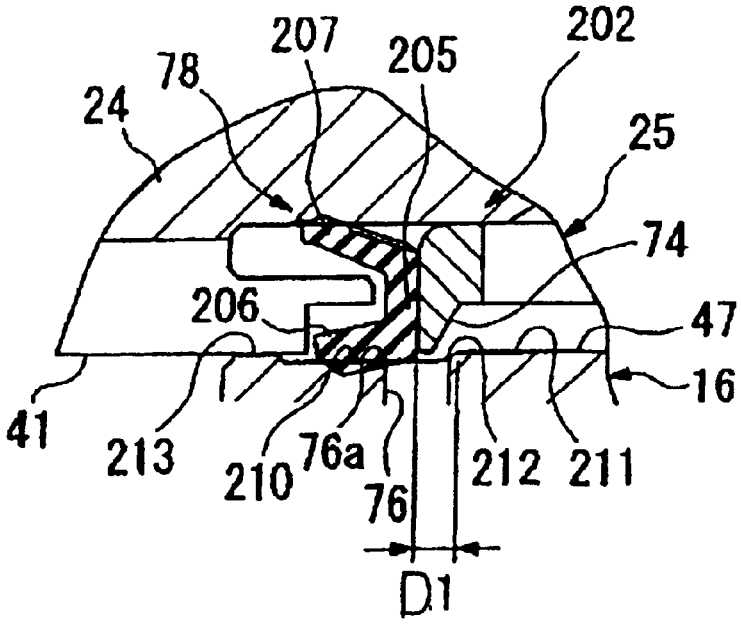
FIG. 3 is a detailed view of portion B in FIG. 1 of the master cylinder of the first embodiment according to the invention.

The small diameter hydraulic chamber side cut-off portion 201 is constituted as shown in FIG. 2 and the large diameter pressurizing chamber side cut-off portion 202 is constituted as shown in FIG. 3.

Here, both of the cup seals 61 and 78 respectively used in the small diameter hydraulic chamber side cut-off portion 201 and the large diameter pressurizing chamber side cut-off portion 202 are formed substantially in a ring-like shape although sizes thereof differ and each thereof is provided with a bottom portion 205 in a shape of a circular disk, an inner lip portion 206 in a ring-like shape projected from an inner peripheral side of the bottom portion 205 to one side thereof and an outer lip portion 207 in a ring-like shape projected from an outer peripheral side of the bottom portion 205 to a side the same as that of the inner lip portion 206. The inner lip portion 206 is more or less inclined to reduce a diameter of a projected front end side thereof in a free state in which external force is not exerted thereto and the outer lip portion 207 is more or less inclined to increase a diameter of a projected front end side thereof in the free state. Note that the cup seal 61 and 78 are illustrated in the free state in FIG. 2 and FIG. 3.

An explanation will be given of the large diameter pressurizing chamber side cut-off portion 202.

In the large diameter piston portion 47 of the primary piston 16, the outer peripheral portion, that is, the bottom portion 15a side thereof (left side in FIG. 3), constitutes a small outer diameter portion 210 in a straight shape, and the outer peripheral portion, on the opposed side of the bottom portion 15a, constitutes a large outer diameter portion 211. The interval between the small outer diameter portion 210 and the large outer diameter portion 211 constitutes a tapered outer diameter portion 212 inclined to make continuous the small outer diameter portion 210 and the large outer diameter portion 211. The front end portion thereof, located much nearer to the bottom portion 15a than the small outer diameter portion 210, constitutes a front end diameter portion 213 having a diameter larger than that of the small outer diameter portion 210 to be slidingly guided by the large diameter cylinder portion 41 of the fourth member 24.

Further, the relief port 76, previously mentioned, has an opening portion 76a thereof from a portion of the small outer diameter portion 210 on a side of the tapered outer diameter portion 212 to a portion of the tapered outer diameter portion 212 on a side of the small diameter portion 210. Further, at the initial portion, the cup seal 78 is disposed on an outer diameter side of the small outer diameter portion 210 and partially overlap the opening portion 76a.

According to the large diameter pressurizing chamber side cut-off portion 202, when the primary piston 16 is slidingly moved from the initial position, a rear end portion of the cup seal 78 rides over the tapered outer diameter portion 212 on the side of the large outer diameter portion 211 of the opening portion 76a to thereby enlarge the diameter of the cup seal 78, an interference with the primary piston 16, that is, compacting force is partially increased, and there is generated partially-peaked face pressure between the cup seal 78 and the primary piston 16. As a result, the cup seal 78 cuts communication between the large diameter pressurizing chamber 56 and the fluid supply chamber 71, that is, the reservoir 12 via the relief port 76.

Further, when the primary piston 16 is made to advance and the rear end portion of the cup seal 78 rides over a corner portion at a boundary between the tapered outer diameter portion 212 and the large outer diameter portion 211, the cup seal 78 is brought into line contact with the primary piston 16 at the corner portion and the peak of the face pressure is disposed at the line contact portion. Thereby, the cup seal 78 continues to cut communication between the large diameter pressurizing chamber 56 and the fluid supply chamber 71, that is, the reservoir 12 via the relief port 76.

Further, while the primary piston 16 is advancing further, as long as the inner lip portion 206 of the cup seal 78 is in contact with the corner portion, the peak of the face pressure is maintained at the corner portion, communication between the large diameter pressuring chamber 56 and the fluid supply chamber 71, that is, the reservoir 12 via the relief port 76, continues to be cut. When the cup seal 78 finally rides over the large outer diameter portion 211 as a whole, the peak of the face pressure is moved to the projected front end of the inner lip portion 206 of the cup seal 78 and the communication between the large diameter pressurizing chamber 56 and the fluid supply chamber 71, that is, the reservoir 12 via the relief port 76, is continued to be cut at the portion.

Thereby, an ineffective stroke of the primary piston 16 until the large diameter pressurizing chamber side cut-off portion 202 is brought into the closed state, is up to the point at which the rear end portion of the cup seal 78 rides over the tapered outer diameter portion 212 on the rear side of the opening portion 76a and becomes as short as shown by notation D1 in FIG. 3. Further, at the initial position, the opening portion 76a of the relief port 76 is widely opened and therefore, the high flow function is also ensured.

Next, an explanation will be given of the small diameter hydraulic chamber side cut-off portion 201.

The small diameter piston portion 46 of the primary piston 16 is formed in a straight shape and an opening portion 58a of the relief port 58 is opened to an outer peripheral face thereof in the straight shape. Further, the cup seal 61 is provided on the bottom portion 15a side of the opening portion 58a (left side in FIG. 2) as a whole at the initial position.

According to the small diameter hydraulic chamber cut-off portion 201, since the cup seal 61 moves on the outer peripheral face of the same outer diameter and therefore, peak of face pressure is disposed on the bottom portion 15a side of the cup seal 61, that is, on a front side thereof so that, when the cup seal 61 passes over the opening portion 58a of the relief port 58, communication between the large diameter pressurizing chamber 56 and the primary side small diameter hydraulic chamber 49 via the relief port 58 at the peak portion of the face pressure, that is, at the front portion is cut.

Thereby, an ineffective stroke of the primary piston 16 until the small diameter hydraulic chamber side cut-off portion 201 is brought into the closed state, is up to the point at which the front portion of the cup seal 58 is disposed behind the opening portion 58a and becomes as long as shown by notation D2 in FIG. 2 (D2>D1). However, the opening portion 58a of the relief portion 58 does not overlap the cup seal 61 but is widely opened at the initial position so that the high flow function is ensured.

Here, in the case that a traction control apparatus is combined to connect to the delivery holes 113 and 114 of the master cylinder main body 11, when the traction control apparatus forcibly sucks the brake fluid from the reservoir 12 via the delivery hole 114, the primary side small diameter hydraulic chamber 49, the large diameter pressurizing chamber 56 and the fluid supply chamber 71, at the initial position, both of the opening portion 76a of the relief port 76 and the opening portion 58a of the relief port 58 are widely opened, and the brake fluid can be made to flow to the traction control apparatus at a large flow rate.

Further, the secondary side cut-off portion 200 is also constructed by a constitution similar to that of the large diameter pressurizing chamber side cut-off portion 202 and the high flow function is ensured.

Further, according to the first embodiment, the first member 21 is formed with a small diameter hydraulic chamber communication port 82 constantly communicated with the primary side small diameter hydraulic chamber 49 via the small diameter hydraulic chamber communication path 51, a pressurizing chamber communication port 83 constantly communicated to the large diameter pressurizing chamber 56 via the pressurizing chamber communication flow path 59 and a fluid supply chamber communication port 84 constantly communicated with the fluid supply chamber 71. The ports 82, 83 and 84 are connected with a control valve 86 provided separately from the master cylinder main body 11 via communication flow paths 85a, 85b and 85c respectively comprising external pipes.

The control valve 86 is provided with a valve cylinder main body 87 in a shape of a bottomed cylinder, a valve piston 88 slidably fitted to the inside of the valve cylinder main body 87, a valve spring 89 provided on one end of the valve piston 88 for urging the valve piston 88 toward a bottom portion 87a of the valve cylinder main body 87, a lid member 90 for closing the opening side of the valve cylinder main body 87 and holding the valve spring 89 between the lid member 90 and the valve piston 88, and a C ring 91 for fixing the lid member 90 to the valve cylinder main body 87. Further, a valve cylinder 92 is constituted by the valve cylinder main body 87 and the lid member 90.

In the valve piston 88, there are formed a first shaft portion 93 at a front end thereof, a second shaft portion 94 next to the first shaft portion 93 and having a diameter larger than that of the first shaft portion 93, a third shape portion 95 next to the second shaft portion 94 and having a diameter smaller than that of the second shaft portion 94, a fourth shaft portion 96 next to the third shaft portion 95 and having a diameter larger than that of the second shaft portion 94, and a fifth shaft portion 97 next to the fourth shaft portion 96 and having a diameter smaller than that of the fourth shaft portion 96 and inserted into the valve spring 89. A seal member 99 is provided at a front end of the first shaft portion 93. Further, the second shaft portion 94 and the fourth shaft portion 96 of the valve piston 88, are provided with two O-rings (ring seals) 100 and 101 for constantly sealing clearances thereof from an inner face of the valve cylinder main body 87. Further, the two O-rings 100 and 101 may be provided on the side of the valve cylinder main body 87.

At a bottom portion 87a of the valve cylinder main body 87, there is formed a port 102 opened and closed by the seal member 99 of the valve piston 88 and the port 102 is communicated with the pressurizing chamber communication port 83 via the communication flow path 85b (flow path communicated to the large diameter pressurizing chamber 56). Further, on a side of the bottom portion 87a of a side portion 87b of the valve cylinder main body 87, there is formed a portion 105 constantly communicated to a fluid chamber (relief chamber) 104 surrounded by the valve cylinder main body 87, the first shaft portion 93 and the second shaft portion 94 forming outer peripheries on a side opposed to the valve spring 89 of the valve piston 88 and the seal member 100, and the port 105 is communicated to the fluid supply chamber communication port 84 via the communication flow path 85c. Further, the side portion 87b of the valve cylinder main body 87 is formed with a port 107 constantly communicated with a fluid chamber 106 surrounded by the valve cylinder main body 87, the second shaft portion 94, the third shaft portion 95 and the fourth shaft portion 96 of the valve piston 88, and the seal members 100 and 101, and the port 107 is communicated to the small diameter hydraulic chamber communication port 82 via the communication flow path 85a (flow path communicating the small diameter hydraulic chamber 49 and the valve cylinder 92). Here, the seal member 99 of the valve piston 88 and the port 102 of the valve cylinder main body 87 constitute an opening and closing valve mechanism 108 for communicating and cutting the communication between the fluid chamber 104 and the communication flow path 85b communicating to the large diameter pressurizing chamber 56.

Further, the control valve 86 balances the valve piston 88 by hydraulic pressure of the large diameter pressurizing chamber 56 introduced to the port 102, hydraulic pressure of the primary side small diameter hydraulic chamber 49 introduced to the fluid chamber 106 and urge force of the valve spring 89. The balance at this occasion is represented by the following equation.

Figure 4:
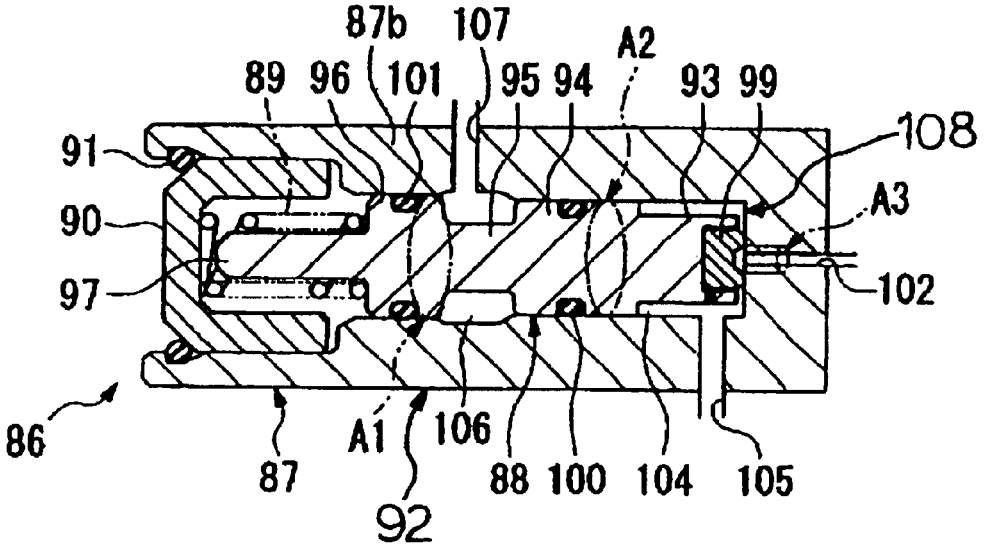
FIG. 4 is a sectional view showing a sectional area of a seal portion of a valve piston of a control valve of the master cylinder of the first embodiment according to the invention.

That is, as shown in FIG. 4, when a seal sectional area by the O-ring 101 is designated by notation A1, a seal sectional area by the O ring 100 is designated by notation A2 (incidentally, A2<A1), a seal sectional area by the seal member 99 is designated by notation A3, the hydraulic pressure of the primary side small diameter hydraulic chamber 49 is designated by notation Pa, the hydraulic pressure of the large diameter pressurizing chamber 56 is designated by notation Pb and a set load of the valve spring 89 is designed by notation F, the following equation is established.

$$Pa\times(A1-A2)+Pb\times A3=F$$

Figure 5:
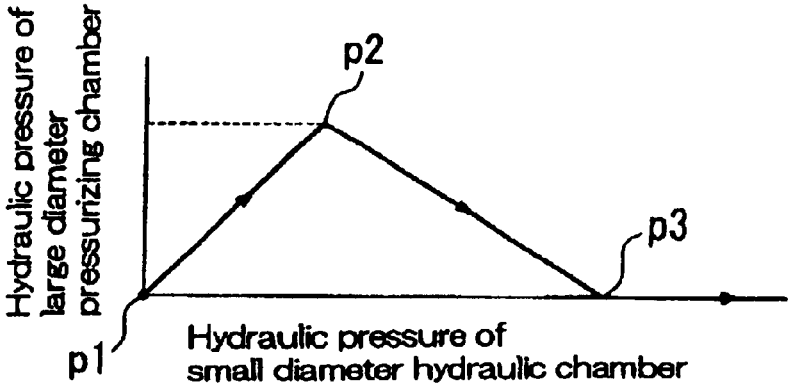
FIG. 5 is a characteristic diagram showing a relationship between hydraulic pressure of a small diameter hydraulic chamber and a large diameter pressurizing chamber on a primary side of the master cylinder of the first embodiment according to the invention.

Further, as shown in FIG. 5, when the hydraulic pressure of the large diameter pressurizing chamber 56 starts to rise (point p1), the cup seal 61 is opened, and pressure of the primary side small diameter hydraulic chamber 49 also rises by the same pressure as the hydraulic pressure of the large diameter pressurizing chamber 56 (point p1 through point p2). Then, when Pa×(A1−A2)+Pb×A3>F (point P2, the hydraulic pressure at the point is referred to as pressurizing chamber releasing hydraulic pressure) is established, the valve piston 88 of the control valve 86 is slightly moved against the urge force of the valve spring 89 to thereby open the port 102 by a small amount and the hydraulic pressure of the large diameter pressurizing chamber 56 is started to release. At this occasion, the hydraulic pressure Pb of the large diameter pressurizing chamber 56 is escaped to the reservoir 12 side via the fluid supply chamber 71 such that the hydraulic pressure Pb of the large diameter pressurizing chamber 56 is gradually lowered in accordance with the rise of the hydraulic pressure Pa of the primary side small diameter hydraulic chamber 49 to satisfy the equation of Pa×(A1−A2)+Pb×A3=F, in other words, the hydraulic pressure Pb of the large diameter pressurizing chamber 56 is lowered in correlation with the rise of the hydraulic pressure of the primary side small diameter hydraulic chamber 49 in accordance with the following equation (point p2 through point p3).

$$Pb=\{F-Pa\times(A1-A2)\}+A3$$

Here, at highly elevated pressure, that is, in operating to depress the brake pedal at comparatively fast speed, the input from the brake booster linearly rises, the hydraulic pressure Pa of the primary side small diameter hydraulic chamber 49 rises at a constant rate and therefore, the control vale 86 escapes the hydraulic pressure Pb of the large diameter pressurizing chamber 56 to the reservoir 12 side such that the hydraulic pressure Pb gradually lowers along a preset slope. The slope can be arbitrarily set by pertinently selecting the seal sectional area A1 through A3 and the like and tuning in accordance with a vehicle can be carried out.

Further, when the balance equation becomes Pa×(A1−A2)>F, the control valve 86 maintains an opened state and therefore, the hydraulic pressure of the large diameter pressurizing chamber 56 is released to be the atmospheric pressure (point p3 and thereafter) and brake hydraulic pressure is controlled only by the primary side small diameter hydraulic chamber 49.

Next, an explanation will be given of operation of the master cylinder according to the above-described first embodiment.

When the primary piston 16 is moved toward the bottom portion 15a by the rod of the booster connected to the brake pedal, the secondary piston 17 is also moved simultaneously via the primary piston spring 68. Further, according to the side of the primary piston 16, at a time point which the large diameter pressurizing chamber side cut-off portion 202 having the short ineffective stroke, closes the relief port 76 by the cup seal 78, the large diameter pressurizing chamber 56 elevates the hydraulic pressure and the fluid is supplied to the primary side small diameter hydraulic pressure chamber 49 via the cup seal 61, that is, the primary side small diameter hydraulic chamber side cut-off portion 201. At this occasion, even when the small diameter hydraulic chamber side cut-off portion 201 having the longer ineffective stroke, is not closed completely, the fluid is supplied only from the large diameter pressurizing chamber 56 side to the primary side small diameter hydraulic chamber 49 via the small diameter hydraulic chamber side cut-off portion 201. This is similar to the fluid supply by the cup seal 61 and therefore, there poses no problem. Also according to the secondary piston 17, at a time point which the relief port 35 of the secondary side cut-off portion 200 is closed by the cup seal 36, the secondary side small diameter hydraulic chamber 32 elevates the hydraulic pressure.

When the hydraulic pressure rises, in the primary side small diameter hydraulic chamber 49, a fluid amount of a stroke amount of the primary piston 16 multiplied by (outer diameter of the large diameter pressurizing chamber 56 subtracted by outer diameter of the primary side small diameter hydraulic chamber 49) presses and open the cup seal 61 and flows from the large diameter pressurizing chamber 56 to the primary side small diameter hydraulic chamber 49 and compenstates for an ineffective fluid amount (mainly amount of caliper rollback) at an initial stage of the stroke. Thereafter, hydraulic pressure of the large diameter pressurizing chamber 56 and hydraulic pressure of the primary side small diameter hydraulic chamber 49 are elevated at the same pressure to the pressurizing chamber releasing hydraulic pressure while delivering the brake fluid from the large diameter pressurizing chamber 56 to the primary side small diameter hydraulic chamber 49 to compensate for a insufficiency in the fluid amount accompanied by the small diameter of the primary side small diameter hydraulic chamber 49 (point p1 through point p2).

Further, when the hydraulic pressure rises to the pressurizing chamber releasing hydraulic pressure, the control valve 86 releases the hydraulic pressure of the large diameter pressurizing chamber 56. At this occasion, as described above, the control vale 86 escapes the hydraulic pressure Pb of the large diameter pressurizing chamber 56 to the reservoir 12 side via the fluid supply chamber 71 such that the hydraulic pressure Pb of the large diameter pressurizing chamber 56 gradually lowers in accordance with the rise of the hydraulic pressure Pa of the primary side small diameter hydraulic chamber 49 (point p2 through point p3).

Further, when the hydraulic pressure of the large diameter pressurizing chamber 56 is released to be the atmospheric pressure, the control valve 86 maintains the opened state and the brake hydraulic pressure is controlled only by the primary side small diameter hydraulic chamber 49.

According to the above-described first embodiment, there is provided the control valve 86 capable of escaping the hydraulic pressure of the large diameter pressuring chamber 56 which has been elevated temporarily, to the reservoir 12 side to gradually lower it in accordance with the rise of the hydraulic pressure of the primary side small diameter hydraulic chamber 49. Therefore, the fluid supply from the side of the large diameter pressurizing chamber 56 to the side of the primary side small diameter hydraulic chamber 49, that is, the fast fill is carried out by opening the cup seal 61 by a reduction in the volume of the large diameter pressurizing chamber 56 by the sliding movement of the stepped primary piston 16 toward the primary side small diameter hydraulic chamber 49 and when the hydraulic pressure of the large diameter pressurizing chamber 56 is elevated, the control valve 86 escapes the hydraulic pressure of the large diameter pressurizing chamber 56 to the reservoir 12 to gradually lower it in accordance with the rise of the hydraulic pressure of the primary side small diameter hydraulic chamber 49.

Therefore, the pedal stroke can be shortened by the effect of the fast fill and further, when the hydraulic pressure of the large diameter pressurizing chamber 56 is released, the hydraulic pressure of the large diameter pressuring chamber 56 is not quickly lowered but is gradually lowered and therefore, the pedal reaction force is not quickly reduced and it is presented that the pedal stroke is extended without being accompanied by the pedal depressing force and moved to the side of the primary side small diameter hydraulic chamber 49, as a result, there can be reduced the strange feeling in the pedal operation that only the vehicle speed is reduced in the feeling of depressing the pedal off lightly.

Figure 6:
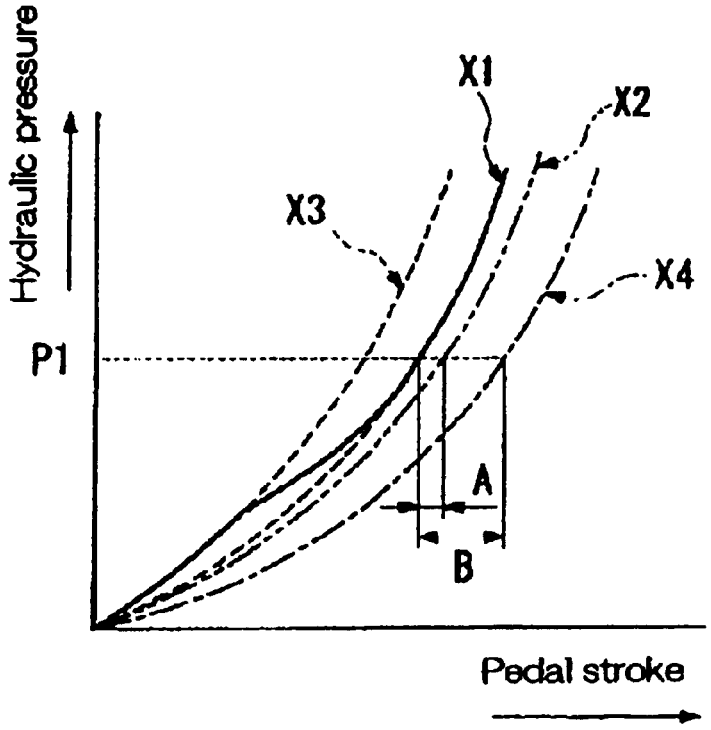
FIG. 6 is a characteristic diagram showing a relationship between a pedal stroke and hydraulic pressure of the master cylinder of the first embodiment according to the invention.
Figure 7:
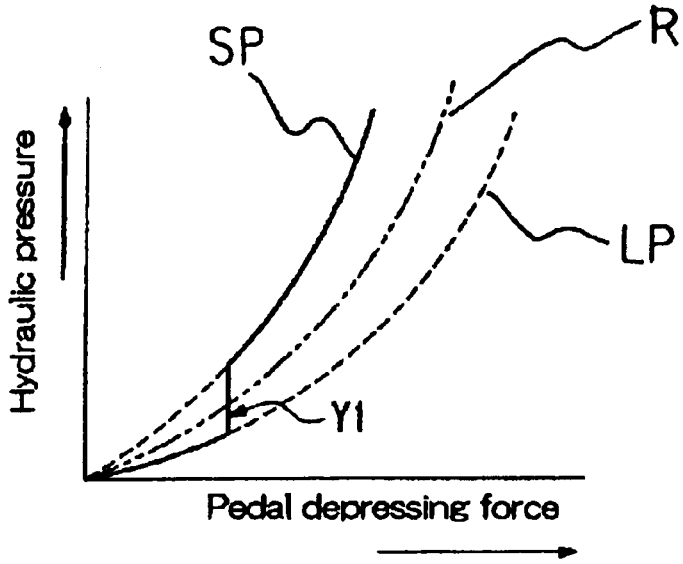
FIG. 7(a) is a characteristic diagram showing a relationship between pedal depressing force and hydraulic pressure of a conventional master cylinder.
FIG. 7(b) is a characteristic diagram showing a relationship between pedal repressing force and hydraulic pressure of the master cylinder of the first embodiment according to the invention.
Figure 7:
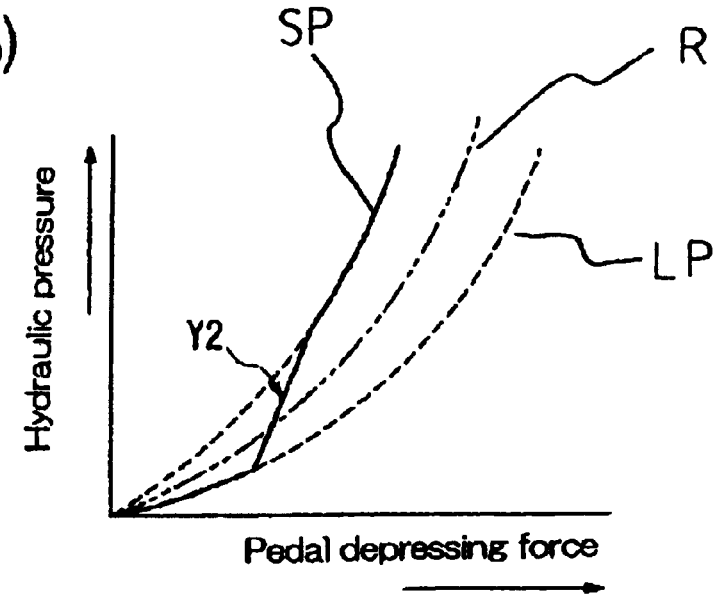

That is, as shown in FIG. 6, in view of a characteristic of the pedal stroke versus rise of the hydraulic pressure, according to the above-described first embodiment, by using a combination of the large diameter pressurizing chamber 56 having a large diameter larger than that of the master cylinder of the straight type and capable of shortening the stroke more than the stroke of the master cylinder of the straight type and the primary side small diameter hydraulic chamber 49 having a diameter smaller than that of the master cylinder of the straight type and the stroke extended more than that of the master cylinder of the straight type, as shown by notation X1 in FIG. 6, the pedal stroke necessary for generating the same hydraulic pressure can be shortened as compared with that in the case of setting by the straight type (designated by notation X2 in FIG. 6).

Here, what is designated by notation X3 in FIG. 6 shows a characteristic when only the large diameter pressurizing chamber 56 is of a straight type, and what is designated by notation X4 in FIG. 6 shows a characteristic when only the primary side small diameter hydraulic chamber 49 is of a straight type, respectively. Notation A designates an amount of shortening the pedal stroke of the master cylinder (X1) of the first embodiment as compared with that of the master cylinder (X2) in the case of being set by the straight type and notation B designates an amount of shortening the pedal stroke of the master cylinder (X1) of the first embodiment as compared with that of the master cylinder (X4) in the case of constituting only the primary side small diameter hydraulic chamber 49 by the straight type.

Further, in FIGS. 7(a) and 7(b) showing a relationship between the pedal depressing force and rise of the hydraulic pressure, a line LP shows a relationship between the pedal depressing force and the rise of the hydraulic pressure in the large diameter pressurizing chamber 56, and a line SP shows a relationship between the pedals depressing force and the rise of the hydraulic pressure in the primary side small diameter hydraulic chamber 49, respectively. According to the conventional master cylinder, the hydraulic pressure of the large diameter pressurizing chamber 56 is lowered in one moment when the hydraulic pressure of the large diameter pressurizing chamber 56 is released so that as shown by notation Y1 in FIG. 7(a), the hydraulic pressure rises without being accompanied by the pedal depressing force. However, according to the master cylinder of the first embodiment, by providing the control valve 86, the hydraulic pressure of the large diameter pressurizing chamber 56 gradually lowers so that the pedal reaction force is not lowered in one moment but the hydraulic pressure rises with the pedal depressing force as shown by notation Y2 in FIG. 7(b), and, as a result, there can be reduced the strange feeling in the pedal operation that only the vehicle speed is reduced in the feeling of depressing the pedals off lightly. Further, in FIGS. 7(a) and 7(b), notation R designates a middle line of the lines LP and SP for facilitating to compare the lines LP and SP.

Further, since the ineffective stroke of the primary piston 16 until the small diameter hydraulic chamber side cut-off portion 201 is brought into the closed state is made longer than that of the primary piston 16 until the large diameter pressurizing chamber side cut-off portion 202 is brought into the closed state, with regard to shortening of the ineffective stroke for realizing the fast fill function at an early, only positional accuracy control in the axial direction of the large diameter pressurizing chamber side cut-off portion 202 is required and it is not necessary to strictly control positional accuracy in the axial direction of the small diameter hydraulic chamber side cut-off portion 201. Further, even when constituted in this way, in supplying the fluid from the large diameter pressurizing chamber 56 to the primary side small diameter hydraulic chamber 49, even when the small diameter hydraulic chamber side cut-off portion 201 having the longer ineffective stroke is not brought into the closed state, so far as the large diameter pressurizing chamber cut-off portion 202 having the shorter ineffective stroke is brought into the closed state, the flow of the brake fluid produced by reducing the volume of the large diameter pressurizing chamber 56 by sliding movement of the primary piston 16 toward the primary side small diameter hydraulic chamber 49, by way of the small diameter hydraulic chamber side cut-off portion 201, is constituted by the flow from the side of the large diameter pressurizing chamber 56 to the side of the primary side small diameter hydraulic chamber 49, the flow is the same as the flow in supplying the fluid from the side of the large diameter pressurizing chamber 56 to the side of the primary side small diameter hydraulic chamber 49 via the cup seal 61 and therefore, the fast fill function is not deteriorated.

Further, the supply of the fluid from the large diameter pressurizing chamber 56 to the primary side small diameter hydraulic chamber 49 at the initial stage of operation, can be carried out without to press-open the cup seal 61 by fluid flow and therefore, fluid flow resistance is not caused and the fast fill function is further promoted.

Therefore, there can be adopted the cut-off structure of a low cost type in the small diameter hydraulic chamber side cut-off portion 201 while ensuring the fast fill function and the high flow function, and therefore, cost can be reduced.

Further, the above-described first embodiment can also be modified as follows.

Figure 8:
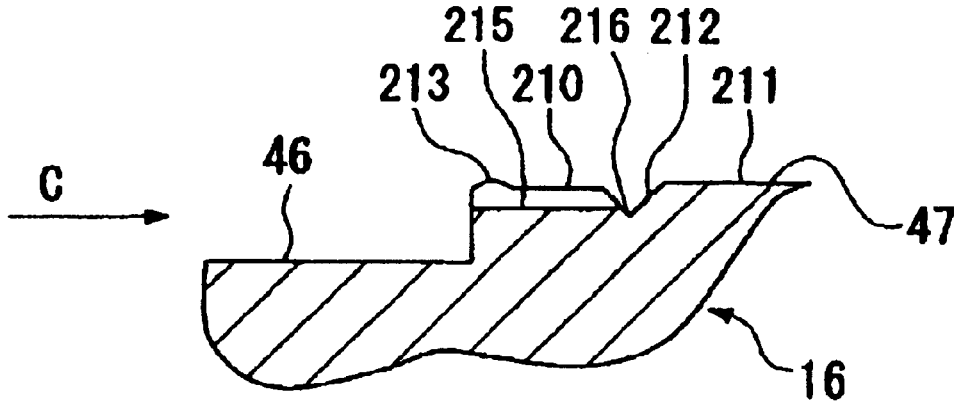
FIG. 8 is a sectional view of a portion of a primary piston of a modified example of the master cylinder of the first embodiment according to the invention.
Figure 9:
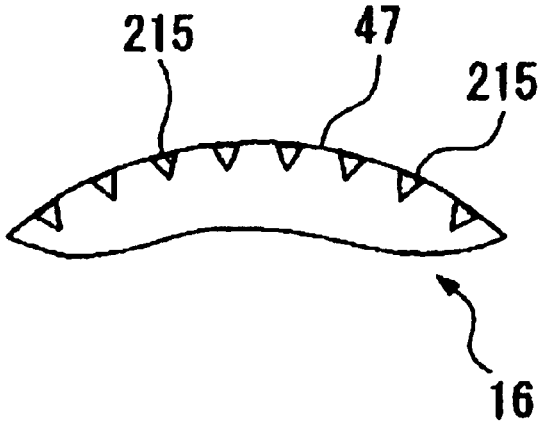
FIG. 9 is a view of the modified example of FIG. 8 of the master cylinder of the first embodiment according to the invention, viewed from a C arrow mark direction.

As shown in FIG. 8 and FIG. 9, the relief port 76 of hole shape may be replaced with such a structure that there are provided a plurality of groove portions 215 in a straight shape penetrated to the bottom portion 15a along the axial line direction in a circumferential direction (for example, provided at positions equally dividing for circumference by 36) on the side of the bottom portion 15a of the tapered outer diameter portion 212 of the large diameter piston portion 47 (left side in FIG. 8) and the port 74 and the large diameter pressurizing chamber 56 are made communicatable to each other via the groove portions 215.

Further, when the primary piston 16 is disposed at the initial position, the cup seal 78 which is not brought into contact with the tapered outer diameter portion 212, communicates the port 74 and the large diameter pressurizing chamber 56 via the groove portions 215, while when the primary piston 16 is slidingly moved to the side of the primary side small diameter hydraulic chamber 49 and the cup seal 78 rides over the tapered outer diameter portion 212, the cup seal 78 cuts communication between the port 74 and the large diameter pressurizing chamber 56 via the groove portions 215. In this case, a flow path sectional area of a clearance between all of the groove portions 215 and the cup seal 78, is made to be equal to or higher than that in correspondence with $\phi 4$ (mm). Here, the groove portions 215 may be either of a U-shaped and a square shape other than a V-shape shown in FIG. 9. Further, although when the groove portion 215 is formed by form rolling, dimensional accuracy thereof is not so excellent, in order to improve the dimensional accuracy, there is formed a V-like groove 216 in a shape of a circular ring at a rear end portion of the groove portion 215. By the V-like groove 216, strict tolerance with regard to the ineffective stroke can be dealt with.

When constituted as described above, it is not necessary to form a complicated port as well as because the groove portion 215 can easily be formed by form rolling or forging, a work time period can be shortened and cost can be reduced in accordance therewith. Further, by making the depth of the groove portions 215 deep, the flow path sectional area can easily be enlarged, which is effective in promoting the high flow function.

Figure 10:
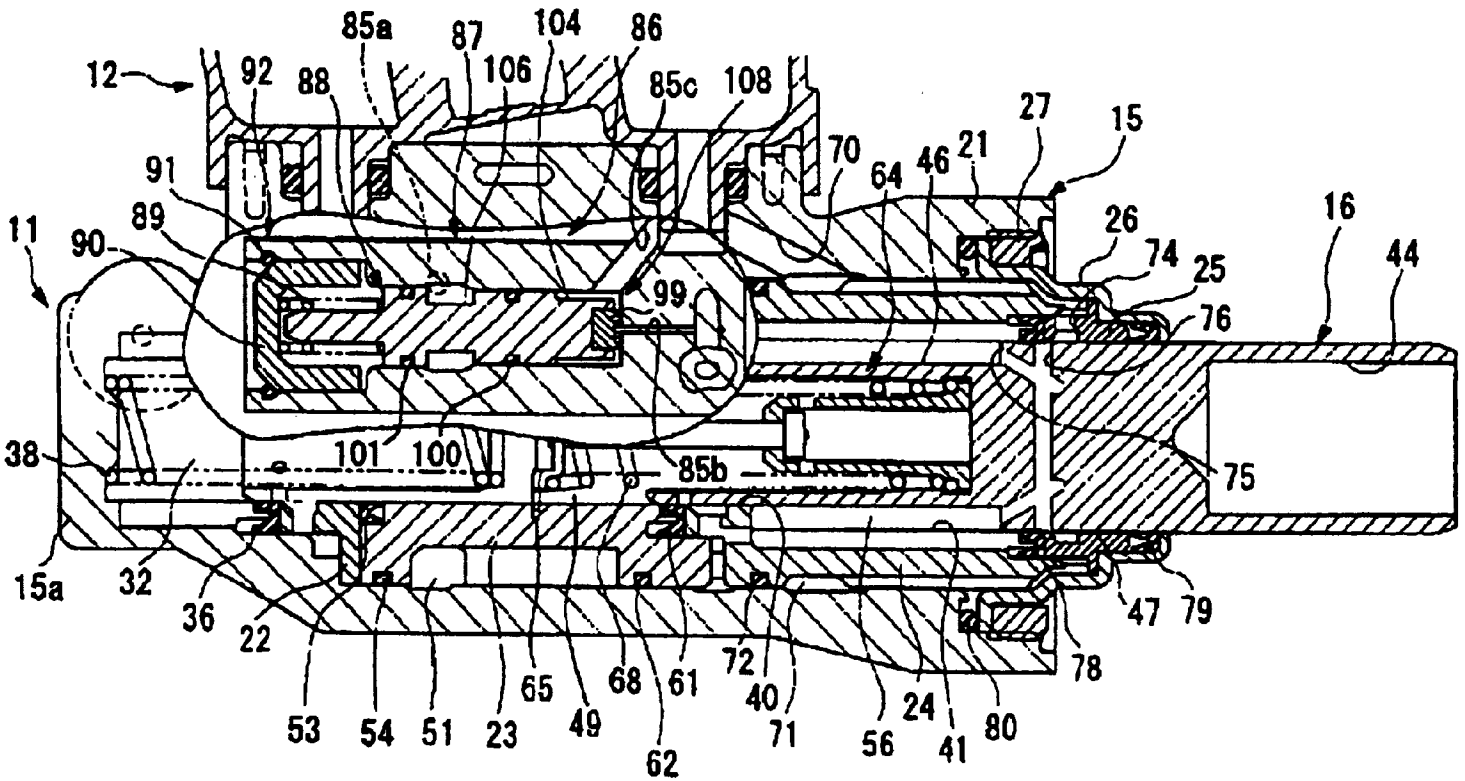
FIG. 10 is a sectional view of a modified example of the master cylinder of the first embodiment according to the invention showing a constitution.

Further, although according to the master cylinder of the above-described first embodiment, an explanation has been given by taking an example of the case in which the control valve 86 is provided separately from the master cylinder main body 11, as shown in FIG. 10, the control valve 86 can integrally be provided, for example, inside the first member 21 of the master cylinder main body 11 along with the communication pipe members 85a through 85c. In this case, the axis of the valve piston 88 of the control valve 86, is arranged to the primary piston 16 and the secondary piston 17 coaxially arranged in parallel therewith and overlappingly in the axial direction to thereby prevent a length of the master cylinder in the axial direction from increasing.

Further, although according to the master cylinder of the above-described first embodiment, an explanation has been given of the example in which the inside of the stepped cylinder 15 is partitioned into the large diameter pressurizing chamber 56 on the large diameter piston portion 47 side and the primary side small diameter hydraulic chamber 49 on the small diameter piston portion 46 side and further, there is provided the cup seal 61 for permitting the brake fluid to flow only from the large diameter pressurizing chamber 56 to the primary side small diameter hydraulic chamber 49, the invention is not limited thereto but there may be provided a check valve with a sealing function (reverse flow checking opening and closing portion) in place of the cup seal 61.

Figure 11:
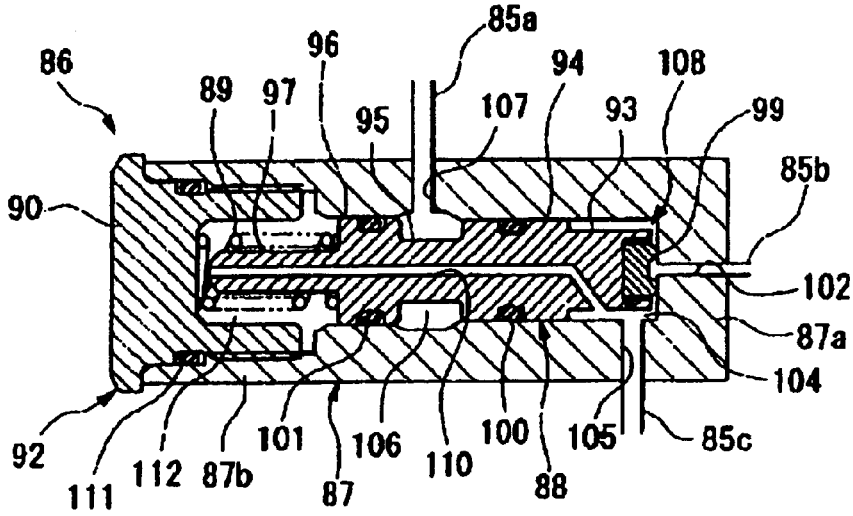
FIG. 11 is a sectional view showing a control valve of a master cylinder of a second embodiment according to the invention.

Next, an explanation will be given as follows of a master cylinder according to a second embodiment of the invention mainly in reference to FIG. 11 focusing on a portion thereof different from the first embodiment. Further, portions thereof similar to those of the first embodiment are attached with the same notations and an explanation thereof will be omitted.

The master cylinder according to the second embodiment differs from the first embodiment in the constitution of the control valve 86. That is, the valve piston 88 of the control valve 86 according to the second embodiment is formed with a throttle path 110 one end of which is opened to an outer diameter side of the first shaft portion 93, that is, the fluid chamber 104 and other end of which is opened to an end face of the fifth shaft portion 97.

Further, the lid member 90 of the control valve 86 according to the second embodiment is screwed to the valve cylinder main body 87 and an O-ring (ring seal) 111 is provided therebetween for sealing a clearance therebetween. Thereby, an interval between the valve cylinder 92 and a side of the valve piston 88 opposed to the fluid chamber 104, constitutes a damper chamber 112 arranged with the valve spring 89 and operated with the hydraulic pressure. The damper chamber 112 communicates with the fluid chamber 104 via the throttle path 110 (in other words, the other end side of the throttle path 110 opposed to the fluid chamber 104, is opened to the damper chamber 112).

Next, an explanation will be given of operation of the master cylinder according to above-described second embodiment.

When the primary piston 16 is pressed toward the bottom portion 15a by the rod of the booster connected to the brake pedal, the large diameter pressurizing chamber 56 and the primary side small diameter hydraulic chamber 49 are operated similar to the first embodiment until the pressurizing chamber releasing hydraulic pressure is established (point p1 through point p2 shown in FIG. 5).

When the pressurizing chamber releasing hydraulic pressure is established, the control valve 86 releases the hydraulic pressure of the large diameter pressurizing chamber 56. At this occasion, substantially similar to the first embodiment, the control valve 86 escapes the hydraulic pressure Pb of the large diameter pressurizing chamber 56 to the reservoir 12 side via the fluid supply chamber 71 to gradually lower the hydraulic pressure Pb of the large diameter pressurizing chamber 56 in accordance with the rise of the hydraulic pressure Pa of the primary side small diameter hydraulic chamber 49 (point p2 through point p3 shown in FIG. 5).

During the time period, the valve piston 88 finely opens and closes the port 102 by finely vibrating at high speed to thereby escape the hydraulic pressure Pb of the large diameter pressurizing chamber 56 introduced via the communication flow path 85b to the reservoir 12 side via the fluid chamber 104 and the communication flow path 85c, further, the fluid supply chamber 71, since the damper chamber 112 and the fluid chamber 104 are communicated with each other via the throttle path 110, when the valve piston 88 is vibrated finely at high speed, the volume of the damper chamber 112 is repeatedly increased and reduced finely, as a result, the brake fluid is reciprocated between the damper chamber 112 and the fluid chamber 104 via the throttle path 110 and the damper effect is achieved by constituting fluid flow resistance by the throttle path 110. As a result, the high speed fine vibration of the valve piston 88 is attenuated and unusual sound caused by the high speed fine vibration of the valve piston 88 can be prevented from emitting.

Further, the fluid flow resistance caused by the throttle path 110 is set to a degree which does not constitute a hindrance of the operation at normal operational speed and to a degree by which the valve piston 88 cannot follow the above-described high speed fine vibration causing the unusual sound, and as a result, the high speed fine vibration of the valve piston 88 is attenuated.

Further, when the hydraulic pressure of the large diameter pressurizing chamber 56 is released to be the atmospheric pressure, similar to the first embodiment, the control valve 86 is maintained at the opened state and the brake fluid pressure is controlled only by the primary side small diameter hydraulic pressure chamber 49.

Further, in either of the above-described embodiments, the relief chamber of the control valve is communicated with the reservoir, the brake fluid is returned from the relief chamber to the reservoir when the hydraulic pressure of the large diameter pressurizing chamber is released. However, the invention is not limited thereto but, for example, there may be provided an accumulator for containing the brake fluid and the relief chamber and the accumulator may be communicated with each other and the brake fluid when the hydraulic pressure of the large diameter pressurizing chamber is released may be stored in the accumulator via the relief chamber.

As has been explained above, according to the master cylinder of the invention, there is provided the control valve capable of gradually lowering the hydraulic pressure of the large diameter pressurizing chamber in accordance with the rise of the hydraulic pressure of the small diameter hydraulic chamber so that the supply of the fluid from the side of the large diameter pressurizing chamber to the side of the small diameter hydraulic chamber that is, the fast fill is carried out by opening the reverse flow checking opening and closing portion by reducing the volume of the large diameter pressurizing chamber by sliding movement of the stepped piston to the side of the small diameter hydraulic chamber, and when the hydraulic pressure of the large diameter pressuring chamber rises, the control valve gradually lowers the hydraulic pressure of the large diameter pressurizing chamber in accordance with rise of the hydraulic pressure of the small diameter hydraulic chamber.

Therefore, the pedal stroke can be shortened by the effect of the fast fill as well as, when the hydraulic pressure of the large diameter pressurizing chamber is released, the hydraulic pressure of the large diameter pressurizing chamber is not lowered in one moment but is gradually reduced and therefore, the pedal reaction force is not quickly reduced, which prevents that the pedal stroke is extended and moved to the side of the small diameter hydraulic chamber without being accompanied by the pedal depressing force. As a result, there can be reduced the strange feeling in the pedal operation in which only the vehicle speed is reduced with the feeling of depressing the pedal off lightly.

Further, by communicating the damper chamber and the relief chamber via the throttle path formed at the valve piston, when the valve piston of the opening and closing valve mechanism is finely vibrated at high speed when the hydraulic pressure of the large diameter pressurizing chamber is escaped to the reservoir side to gradually lower it in accordance with the rise of the hydraulic pressure of the small diameter hydraulic chamber, the volume of the damper chamber is repeatedly increased and reduced finely, as a result, the brake fluid is reciprocated between the damper chamber and the relief chamber via the throttle path and the damper effect is achieved by constituting the fluid flow resistance by the throttle path. Therefore, fine vibration of the valve piston is attenuated and unusual sound caused by the high speed fine vibration of the valve piston can be prevented from emitting.

Further, according to the master cylinder of the invention, since the ineffective stroke of the stepped piston until the small diameter hydraulic chamber side cut-off portion is brought into the closed state is made larger than that of the stepped piston until the large diameter pressurizing chamber side cut-off portion is brought into the closed state, with regard to shortening of the ineffective stroke for realizing the fast fill function at an early stage, only the positional accuracy control in the axial direction of the large diameter pressurizing chamber side cut-off portion is required, and it is not necessary to strictly control the positional accuracy in the axial direction with regard to the small diameter hydraulic chamber side cut-off portion.

Further, even constituted in this way, in supplying the fluid from the large diameter pressurizing chamber to the small diameter hydraulic chamber, even when the small diameter hydraulic chamber side cut-off portion having the longer ineffective stroke is not brought into the closed state, so far as the large diameter pressurizing chamber side cut-off portion having the shorter ineffective stroke is brought into the closed state, the flow of the brake fluid caused by reducing the volume of the large diameter pressurizing chamber by sliding movement of the stepped piston to the side of the small diameter hydraulic chamber, via the small diameter hydraulic chamber side cut-off portion, is from the large diameter pressurizing chamber side to the small diameter hydraulic chamber side, the same as the flow in supplying the fluid from the side of the large diameter pressurizing chamber to the side of the small diameter hydraulic chamber via the reverse flow checking opening and closing portion, and therefore, the fast fill function is not deteriorated.

Further, supply of the fluid from the large diameter pressurizing chamber to the small diameter hydraulic chamber at the initial stage of operation can be carried out without to press-open the reverse flow checking opening and closing portion by fluid flow and therefore, the fluid flow resistance is not caused and the fast fill function is further promoted.

Therefore, there can be adopted the cut-off structure of a low cost type while ensuring the fast fill function and high flow function, and therefore, cost can be reduced.

Further, the influence of pressure elevating speed by the pedal is not effected and therefore, the fast fill can be carried out stably in any pressure elevating operation.

What is claimed is:

1. A master cylinder comprising:

a stepped cylinder comprising a large diameter cylinder portion and a small diameter cylinder portion;

a stepped piston comprising a large diameter piston portion slidably inserted into the large diameter cylinder portion and a small diameter piston portion slidably inserted into the small diameter cylinder portion;

a reservoir for storing a brake fluid; and a reverse flow checking opening and closing portion for partitioning an inside of the stepped cylinder into a large diameter pressurizing chamber and a small diameter hydraulic chamber, and for permitting the brake fluid to flow from a large diameter pressurizing chamber side to a small diameter hydraulic chamber side, the reverse flow checking opening and closing portion being opened by a reduction in volume of the large diameter pressurizing chamber by sliding movement of the stepped piston toward the small diameter hydraulic chamber side; and a control valve for gradually reducing a hydraulic pressure of the large diameter pressurizing chamber in accordance with a rise in a hydraulic pressure of the small diameter hydraulic chamber;

wherein the control valve comprises a valve piston and a valve spring for urging the valve piston within a valve cylinder; and the valve piston reduces the hydraulic pressure of the large diameter pressurizing chamber when propulsive force produced by the hydraulic pressure of the small diameter hydraulic chamber and propulsive force produced by the hydraulic pressure of the large diameter pressurizing chamber exceed an urging force produced by the valve spring;

wherein the control valve comprises at least two ring seals between the valve cylinder and the valve piston to partition an inside of the valve cylinder, and a chamber formed between the at least two ring seals and the small diameter hydraulic chamber communicate with each other;

wherein the valve spring is at a first side of the valve piston, a relief chamber communicating the reservoir and the large diameter pressurizing chamber is at a second side of the valve piston, and the control valve comprises an opening and closing valve mechanism for establishing or cutting off communication between the relief chamber and the large diameter pressurizing chamber;

wherein the valve cylinder is partitioned by the two ring seals into a relief chamber, a chamber formed between the two ring seals, and a damper chamber that stores the valve spring; and wherein the valve piston comprises a throttle path one end of which opens to the relief chamber and the other end of which opens to the damper chamber.

2. A master cylinder comprising:

a stepped cylinder [comprising] *having* a large diameter cylinder portion and a small diameter cylinder portion;

a stepped piston [comprising] *having* a large diameter piston portion slidably inserted into the large diameter cylinder portion *of the stepped cylinder* and a small diameter piston portion slidably inserted into the small diameter cylinder portion;

a reservoir for storing a brake fluid; [and]

a reverse flow checking opening and closing portion for partitioning an inside of the stepped cylinder into a large diameter pressurizing chamber and a small diameter hydraulic chamber, and for permitting the brake fluid to flow from a large diameter pressurizing chamber side to a small diameter hydraulic chamber side, the reverse flow checking opening and closing portion being opened by a reduction in volume of the large diameter pressurizing chamber by sliding movement of the stepped piston toward the small diameter hydraulic chamber side;

a cut-off portion on the large diameter pressurizing chamber side for cutting communication between the large diameter pressurizing chamber and the reservoir in response to a sliding movement of the stepped piston towards the small diameter hydraulic chamber side; *and*

[a cut-off portion on the small diameter hydraulic chamber side for cutting communication between the large diameter pressurizing chamber and the small diameter hydraulic chamber in response to a sliding movement of the stepped piston to the small diameter hydraulic chamber side; and]

a control valve for gradually reducing a hydraulic pressure of the large diameter pressurizing chamber in accordance with a rise in a hydraulic pressure of the small diameter hydraulic chamber;

[wherein an ineffective stroke of the stepped piston to bring the cut-off portion on the small diameter hydraulic chamber side into a closed state is longer than an ineffective stroke of the stepped piston to bring the cut-off portion on the large diameter pressurizing chamber side into a closed state;]

wherein the control valve comprises *a valve cylinder integrally provided to the stepped cylinder,* a valve piston *received in the valve cylinder* and a valve spring for urging the valve piston [within a valve cylinder]; and the valve piston reduces the hydraulic pressure of the large diameter pressurizing chamber when [propulsive] *a total of a first* force produced by the hydraulic pressure of the small diameter hydraulic chamber and [propulsive] *a second* force produced by the hydraulic pressure of the large diameter pressurizing chamber exceed an urging force produced by the valve spring;

wherein the control valve comprises at least two ring seals between the valve cylinder and the valve piston to partition an inside of the valve cylinder, and a chamber formed between the *two* ring seals and the small diameter hydraulic chamber communicate with each other; [and]

wherein the valve spring is at a first side of the valve piston, a relief chamber communicating the reservoir [and the large diameter pressurizing chamber] is at a second side of the valve piston, and the control valve comprises an opening and closing valve mechanism [for] *having a seal portion secured at the second side of the valve piston for opening or closing a port of the valve cylinder through which the relief chamber communicates with the large diameter pressurizing chamber, the opening and closing mechanism, by means of the seal portion,* establishing or cutting off communication between the relief chamber and the large diameter pressurizing chamber[.]*; and*

*wherein the valve piston keeps the opening and closing valve mechanism open to thereby adjust the hydraulic pressure of the large diameter pressurizing chamber to that of the reservoir while the first force produced by the hydraulic pressure of the small diameter hydraulic chamber exceeds the urging force produced by the valve spring.*

3. The master cylinder of claim 2, wherein the valve cylinder is partitioned by the two ring seals into a relief chamber, a chamber formed between the two ring seals, and a damper chamber that stores the valve spring; and wherein the valve piston comprises a throttle path one end of which opens to the relief chamber and the other end of which opens to the damper chamber.

*4. The master cylinder according to claim 2,*

*wherein a cut-off portion on the small diameter hydraulic chamber side for cutting communication between the large diameter pressurizing chamber and the small diameter hydraulic chamber in response to a sliding movement of the stepped piston toward the small diameter hydraulic chamber side.*

*5. The master cylinder according to claim 4,*

*wherein an ineffective stroke of the stepped piston to bring the cut-off portion on the small diameter hydraulic chamber side into a closed state is longer than an ineffective stroke of the stepped piston to bring the cut-off portion on the large diameter pressurizing chamber side into a closed state.*

*6. The master cylinder according to claim 2,*

*wherein the at least two ring seals are provided at the valve piston, and the diameter of the ring seal provided*

*on the valve spring side is larger than that of the ring seal provided on the relief chamber side.*

*7. A master cylinder comprising:*

*a stepped cylinder having a large diameter bore and a small diameter bore;*

*a stepped piston having a large diameter piston slidably inserted into the large diameter bore of the stepped cylinder and a small diameter piston slidably inserted into the small diameter bore;*

*a reservoir for storing a brake fluid;*

*a reverse flow checking valve configured to partition an inside of the stepped cylinder into a large diameter pressurizing chamber and a small diameter hydraulic chamber,*

*wherein the reverse flow checking valve is opened by a reduction in a volume of the large diameter pressurizing chamber caused by a sliding movement of the stepped piston toward the small diameter hydraulic chamber, thereby permitting the brake fluid to flow from the large diameter pressurizing chamber to the small diameter hydraulic chamber; and*

*a control valve configured to gradually reduce a hydraulic pressure in the large diameter pressurizing chamber as a hydraulic pressure in the small diameter hydraulic chamber rises, the control valve comprising:*

*a valve cylinder integrally provided to the stepped cylinder;*

*a valve piston slidably inserted into the valve cylinder;*

*a valve spring configured to urge the valve piston at one side thereof in a first direction within the valve cylinder;*

*at least two ring seals provided between the valve cylinder and the valve piston to partition an inside of the valve cylinder;*

*a chamber formed between the at least two ring seals, wherein the chamber is in communication with the small diameter hydraulic chamber, and the hydraulic pressure of the small diameter hydraulic chamber imposes a first force on the valve piston in a direction opposite to the first direction;*

*a relief chamber that is in communication with the reservoir, wherein the hydraulic pressure of the large diameter pressurizing chamber imposes a second force on the valve piston in a direction opposite to the first direction via a port of the valve cylinder which communicates between the relief chamber and the large diameter pressurizing chamber; and*

*a valve mechanism comprising a seal portion secured to the other side of the valve piston for opening and closing the port of the valve cylinder to thereby establish and cut off communication between the relief chamber and the large diameter pressurizing chamber, wherein:*

*the valve piston moves against the valve spring to open the valve mechanism to establish communication between the relief chamber and the large diameter pressurizing chamber, thereby reducing the hydraulic pressure of the large diameter pressurizing chamber, when a total of the first force produced by the hydraulic pressure of the small diameter hydraulic chamber and the second force produced by the hydraulic pressure of the large diameter pressurizing chamber exceeds an urging force by the valve spring; and*

*the valve piston keeps the valve mechanism open to thereby adjust the hydraulic pressure of the large diameter pressurizing chamber to that of the reservoir while the first force produced by the hydraulic pressure of the small diameter hydraulic chamber is greater than the urging force by the valve spring.*

*8. The master cylinder according to claim 7,*

*wherein the at least two ring seals are provided at the valve piston, and the diameter of the ring seal provided on the valve spring side is larger than that of the ring seal provided on the relief chamber side.*

*9. The master cylinder according to claim 1,*

*wherein the valve piston keeps the opening and closing valve mechanism open to thereby adjust the hydraulic pressure of the large diameter pressurizing chamber to that of the reservoir while the first force produced by the hydraulic pressure of the small diameter hydraulic chamber exceeds the urging force produced by the valve spring.*

*10. The master cylinder according to claim 1,*

*wherein the at least two ring seals are provided at the valve piston, and the diameter of the ring seal provided on the valve spring side is larger than that of the ring seal provided on the relief chamber side.*

* * * * *

UNITED STATES PATENT AND TRADEMARK OFFICE

CERTIFICATE OF CORRECTION

PATENT NO. : RE 40,573 E
APPLICATION NO. : 11/368335
DATED : November 18, 2008
INVENTOR(S) : Takato Ogiwara et al.

It is certified that error appears in the above-identified patent and that said Letters Patent is hereby corrected as shown below:

In the Claims

In column 24, claim 2, line 26, after "a relief chamber communicating" insert --with--.

Signed and Sealed this

Ninth Day of June, 2009

John Doll

JOHN DOLL
*Acting Director of the United States Patent and Trademark Office*